INVENTOR.
NOBUHITO HOBO
BY
*Linton and Linton*
ATTORNEYS

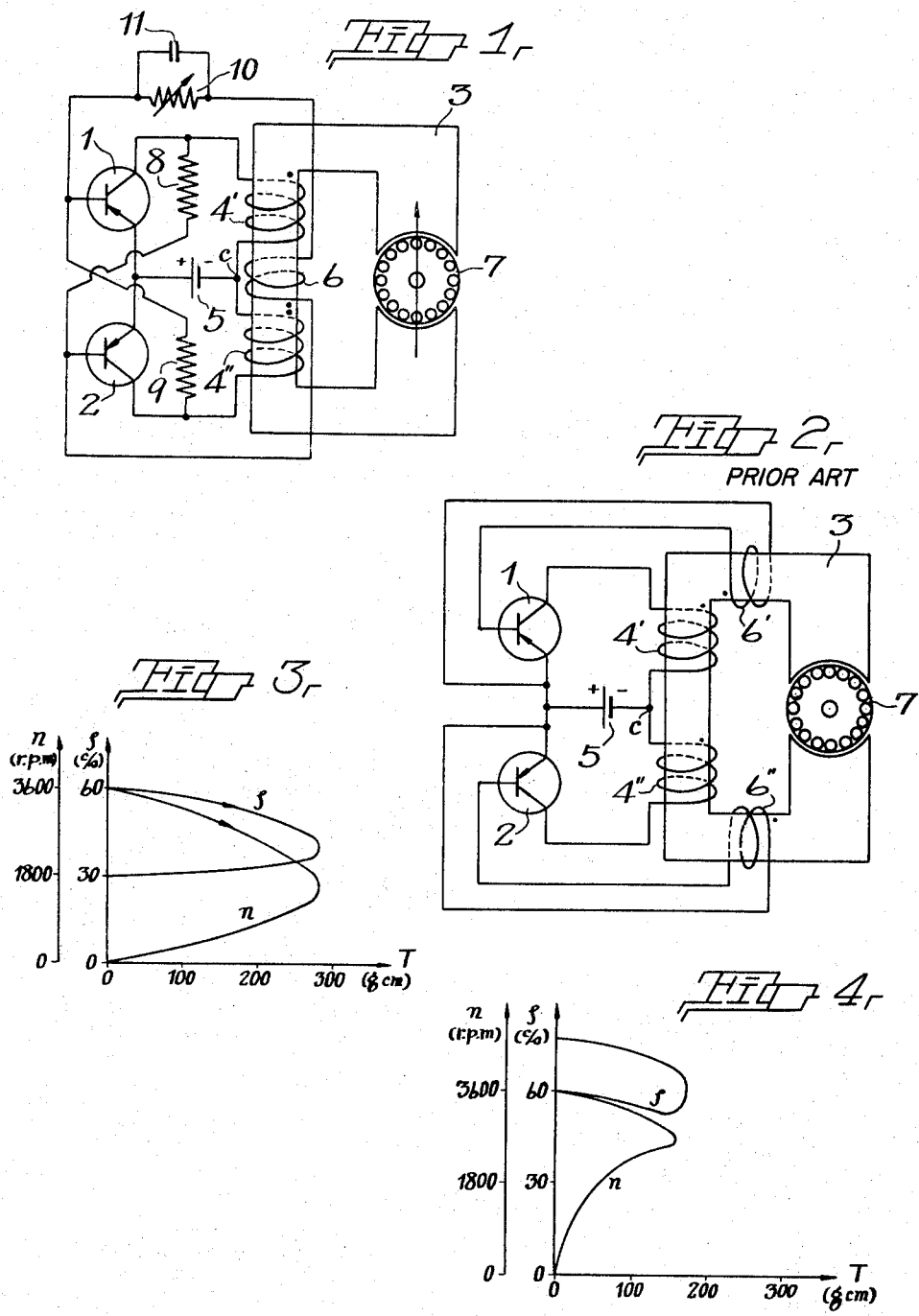

United States Patent Office 3,373,328
Patented Mar. 12, 1968

3,373,328
INDUCTION-MOTOR TYPE TRANSISTOR MOTOR
Nobuhito Hobo, Kariya-shi, Japan, assignor to Nippon
Denso Kabushiki Kaisha, Kariya-shi, Japan
Filed Mar. 10, 1965, Ser. No. 438,509
2 Claims. (Cl. 318—138)

The present invention relates to an induction-motor type transistor motor which produces an alternating magnetic field in the stator by means of a push-pull type relaxation oscillation of a pair of transistors thereby causing a rotary magneto motive power to generate in the squirrel-cage rotor within said stator magnetic field.

An object of the present invention is to provide a push-pull type relaxation oscillation circuit of a pair of transistors by winding a stator winding having an intermediate tap on the stator and only one single feedback coil and thus to simplify the winding of the stator so that the complications of the prior art may be eliminated.

Another object of the present invention is to furnish an induction-motor type transistor motor whose torque characteristic at low speeds is excellent because of the fact that the relaxation oscillation frequency is lowered as the motor loading is increased.

A further object of this invention is to provide an induction-motor type transistor motor whereby it is possible to obtain different rotation numbers by altering the values of resistors for specified fixed stator coils.

The present invention will be better understood and the objects and advantages of this invention will become clear upon perusal of the following description taken in connection with the appended drawings, in which:

FIG. 1 is a circuit diagram showing one preferred embodiment of the induction-motor type transistor motor of the present invention;

FIG. 2 is a circuit diagram of a conventional induction-motor type transistor motor; of the prior art FIG. 3 is the torque characteristic curves obtained as a result of a measurement on the present device; of the present invention;

FIG. 4 is the torque characteristic curves obtained as a result of one experiment on a conventional device of this kind of the prior art.

Figure 5:
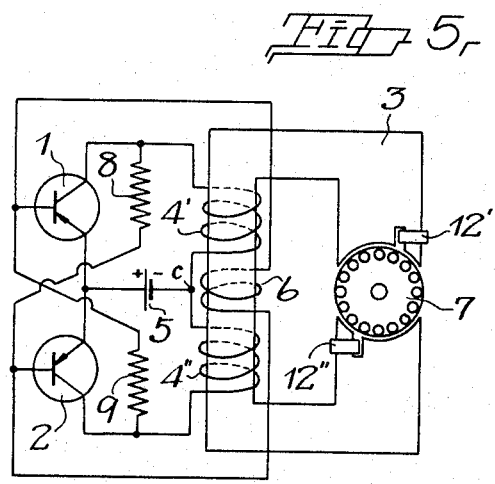
FIG. 5 is a circuit diagram showing a modified preferred embodiment of the present invention; omitting the auxiliary condenser and variable resistor

Referring particularly to the above drawings, and described in accordance with one example of the present invention, a motor of this character of the prior art, heretofore, is so constituted, as is shown in FIG. 2, of stator coils 4', 4" having an intermediate tap c and wound around the stator 3 are connected between the two collectors of a pair of transistors 1 and 2; an electric source 5 is connected between the two emitters of these transistors and the intermediate tap c; both bases of the two transistors are respectively connected with two feedback coils 6', 6" wound around the stator 3; the polarity of each of the coils 4', 4", 6', 6" is taken as is shown by dot in the figure so as to constitute a push-pull type relaxation oscillation circuit; transistors 1 and 2 are made alternately conductive so that an alternate magentic field may be produced in the stator 3; a squirrel-cage rotor 7 is given a rotary motive power; and two feedback coils 6', 6" adjacent the stator coils 4', 4" having the intermediate tap c are wound around the said stator 3, and therefore, the winding to be made on the stator 3 of this kind of motor is complicated in addition to the fact that there is an unbalanced number of turns of the two feedback coils 6', 6", so that, in that case as this, there would be a shortcoming causing the depression of the characteristics, and, since a relaxation oscillation frequency in a low-speed driving condition at a time such as of starting increases compared to that in the normal driving condition, the torque characteristic at low speed times would be too low. Moreover, there would be a defect observed in the fact that when a motor stator coil is determined, the torque characteristic of motor thereupon has been substantially determined, thereby making it difficult to obtain a different rotation number.

The present invention is directed to the elimination of the aforementioned shortcoming so that the winding of the stator may be simplified and the operating characteristics may be enhanced.

Now one preferred example of the present invention will be particularly illustrated in reference to the drawings: Concerning FIG. 1, the reference numerals 1 and 2 are of a pair of transistors; numeral 3 is of a stator; the stator windings 4', 4" divided into two spaced parts or segments by the intermediate tap c have been wound around the said stator 3; a power source 5 has been connected between the intermediate tap c and the two emitters of the transistors 1, 2; a feedback auxiliary winding 6 has been wound around the stator 3, the two ends of which being connected with the two bases of the transistors 1, 2; and a rotor 7 has been provided in the magnetic field of the stator 3. Furthermore, two resistors 8, 9 whose resistance values are equal are connected respectively with between the base of the transistor 1 and the collector of the transistor 2, and between the base of the transistor 2 and the collector of the transistor 1. And a parallel connection circuit of a resistor 10 and a condenser 11 is inserted and connected in series between the said feedback coil 6 and the base of the transistor 1. In the above connection circuit, the polarities of the said two stator coils 4', 4" as well as said one feedback coil 6 are taken in dots in the drawing.

Further describing the operation of the present motor, in FIG. 1, a magnetic field will be produced in the stator in the arrow direction by means of an electric current passing through the stator coil 4' at the moment the transistor 1 becomes conductive, so that the voltage induced in the feedback winding 6 biases the transistor 1 in the normal direction while it biases the transistor 2 in the reverse direction, thereby consummating the conducting state of the transistor 1 and bringing the transistor 2 to a cutoff state and the collector potential of the transistor 1 will thus be equal to the emitter potential while the collector potential of the transistor 2 will be markedly lower than the emitter potential. And a portion of the base current of the transistor 1 will run through the feedback winding 6 while another portion will run through the resistor 9 so that the transistor 1 will become completely conductive and the transistor 2 will be cut off. The voltage induced in the feedback coil 6 will be gradually lowered whereas the current running in the stator coil 4' will be gradually increased; the transistor 1 will not be able to maintain its conduction when a certain conducting period has elapsed; the collector potential of transistor will be lower than the emitter potential; thus the base current of the transistor 2 will run through the resistor 8 and the conductivity of the transistor 2 will be cut out; because a current runs in the stator winding 4" and a magnetic field reverse to the arrow direction is produced in the stator 3, there will be induced in the feedback coil 6 a voltage which imparts a normal bias to the transistor 2 and a reverse bias to the transistor 1, so that, the transistor 2 is made conductive and the transistor 1 is turned off, both instantaneously and suddenly. A portion of the base current of the transistor 2 passes through the feedback coil 6 and other portions run through the resistor 8 making the transistor 2 conductive for a certain period; subsequently, the conduction of the transistor 1 is initiated again; the transistors 1, 2 thereafter are alternately rendered conductive; and the push-pull type relaxation oscillation is continued. Should the characteristics of the transistors 1, 2 be equal, the time during which the transistor 1 is conductive will be equal to that during which the transistor 2 is conductive and a current will run from the power source 5 alternately to the stator coils 4', 4" so that an alternate magnetic field will be produced in the stator 3, and therefore, the squirrel-cage rotor 7 will be able to continue its rotation if and when a starting torque is given thereto. Further, the resistor 10 and the condenser 11 will limit the current running in the feedback coil 6 so as to regulate properly the conducting period of the transistors 1, 2 and also will serve to improve the switching characteristic at the time the transistors 1, 2 turn from being cut off to being conductive but will not be directly involved in the principal operation thereof.

For examples of numerical value, FIG. 3 will show the torque characteristic curves obtained as a result of one experiment on the present device, and FIG. 4 will show the torque characteristic curves obtained as a result of one experiment on a conventional device; in either of these figures, the load torque (g.c.m.) is indicated with abscissa while the motor rotation speed $n$ (r.p.m.) and the switching frequency $f$ (c./s.) of the relaxation oscillation circuit are indicated with ordinate. In the case of the conventional device, the maximum value of the load torque T is about 190 (g.c.m.) whereas it is about 290 (g.c.m.) in the case of the present device, the maximum load torque being thus larger; also in the conventional device, the switching frequency $f$ will indicate an unstable characteristic in a way such that as the load torque T increases it will somewhat be reduced, and, as a larger load torque T is applied, it will vigorously rise up, yet, in the present device, a stable characteristic of torque T-frequency $f$ can be indicated so that the torque characteristic at heavy load may also be stable. Hence the present device is more superior. Regarding FIG. 3 and FIG. 4, in addition, the arrows are supposed to represent the transient direction of the switching frequency $f$ and the rotation speed $n$ when the load torque T has increased.

Figure 6:
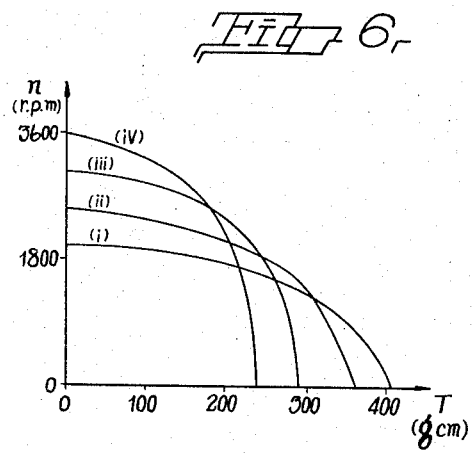
FIG. 6 is a diagram showing the torque characteristic of the circuit diagram as of FIG. 5.

FIG. 5 is to exhibit another example of induction-motor type transistor motor of the present invention, the components of which are shown therein with the same symbols as those of FIG. 1. In this case, because the stator has shading coils 12, 12", the squirrel-cage rotor having a starting torque at one time from the starting period is capable to start itself by virtue of the shading starting principle. FIG. 6 is to exhibit its torque characteristic, showing the alteration of the rotation number of the motor obtainable by changing the values of the resistors 8, 9.

In FIG. 6, the torque characteristics are $(i)$, $(ii)$, $(iii)$ and $(iv)$ when the valves of the resistors 8, 9 are altered to 150Ω, 180Ω, 220Ω and 250Ω. It is found out from this FIG. 6 that the number of rotation will be reduced by lessening the values of the resistors 8, 9 while the starting torque will be contrarily augmented. This is because the maximum value of the alternating flux produced in the stator is increased as the relaxation oscillation frequency is lowered upon increasing the collector current that maintains the continuity of the transistors 1, 2 on account of the fact that the base current of the transistors 1, 2 increases as the values of the resistors 8, 9 are made less.

As aforementioned, an induction-motor type transistor motor, according to the present invention, has been much improved in the torque characteristic because the stator coil can be simplified and, by properly selecting values of the two resistors, the base current of the said two transistors when conductive can be made large enough, the switching frequency of the transistors will be extremely low at heavy load, inasmuch as the present motor is so devised that a single feedback winding has been wound around the stator; said winding has been connected between bases of the pair of transistors; and relaxation oscillation is effected by means of connection of the base of the one transistor and the collector of the other transistor respectively with the two resistors.

Furthermore the utility of the present induction-motor type transistor motor will be increased from the possibility that different torque characteristics are available only by altering the values of the resistors 8, 9 against the same stator winding.

While particular embodiments of this present invention have been illustrated and described, modifications thereof will readily occur to those skilled in the art. It should be understood therefore that the present invention is not limited to the particular arrangements disclosed herein but that the appended claims are intended to cover all possible modifications which do not depart from the true spirit and scope of the invention.

What I claim is:

1. In an induction-motor type transistor motor, an induction motor having a stator and a rotor, a stator winding on said stator, said stator winding being divided into two spaced segments, connected together, a tap connection connected to the connection between said two spaced segments, an auxiliary winding wound on said stator between said two segments, a pair of transistors connected in push-pull for relaxation oscillation, a first resistor connected between the base of a first one of said transistors and the collector of a second one of said transistors, a second resistor of resistance equal to the resistance of said first one of said resistors connected between the base of the second one of said transistors and the collector of the first one of said transistors, the emitters of said two transistors being connected together, a source of direct current connected between said tap connection between said spaced segments and the emitters of said two transistors, and the two ends of said auxiliary winding being respectively connected to the bases of said two transistors and the free ends of said two segments of said stator winding which are not connected together being respectively connected to the two collectors of said pair of transistors.

2. An induction-motor type transistor motor according to claim 1, and an auxiliary resistor and a capacitor connected in shunt with said auxiliary resistor connected in series between one terminal of said auxiliary winding and the base of said first transistor.

References Cited

UNITED STATES PATENTS

| | | | |
|---|---|---|---|
| 3,083,326 | 3/1963 | Deming et al. | 318—138 |
| 3,124,733 | 3/1964 | Andrews | 318—254 X |
| 3,149,291 | 9/1964 | Massey | 331—113 |
| 3,160,804 | 12/1964 | Quittner | 318—138 |
| 3,172,058 | 3/1965 | Freeborn | 331—113 |
| 3,297,934 | 1/1957 | Massey | 331—113 |

ORIS L. RADER, *Primary Examiner.*

G. R. SIMMONS, *Assistant Examiner.*